US012623096B2

(12) United States Patent
Chessari et al.

(10) Patent No.: US 12,623,096 B2
(45) Date of Patent: May 12, 2026

(54) EMERGENCY FILTER SYSTEM FOR VENTILATED HOOD

(71) Applicant: Honeywell Safety Products USA, Inc., Latham, NY (US)

(72) Inventors: Christophe Chessari, Gard (FR); Swan Tuffery, Poulx (FR)

(73) Assignee: Honeywell Safety Products USA, Inc., Latham, NY (US)

(*) Notice: Subject to any disclaimer, the term of this patent is extended or adjusted under 35 U.S.C. 154(b) by 0 days.

(21) Appl. No.: 18/825,443

(22) Filed: Sep. 5, 2024

(65) Prior Publication Data

US 2025/0018231 A1 Jan. 16, 2025

Related U.S. Application Data

(63) Continuation of application No. 17/237,903, filed on Apr. 22, 2021, now Pat. No. 12,133,995, which is a continuation of application No. 15/382,205, filed on Dec. 16, 2016, now Pat. No. 11,027,156, which is a continuation-in-part of application No. 13/278,439, filed on Oct. 21, 2011, now Pat. No. 10,004,925.

(30) Foreign Application Priority Data

Dec. 15, 2011 (EP) .................................... 16204513

(51) Int. Cl.
*A62B 17/04* (2006.01)
*A62B 7/10* (2006.01)
*A62B 17/00* (2006.01)

(52) U.S. Cl.
CPC ................ *A62B 17/04* (2013.01); *A62B 7/10* (2013.01); *A62B 17/006* (2013.01)

(58) Field of Classification Search
CPC ................................ A62B 7/10; A62B 17/04
USPC ................................ 128/201.25; 125/201.25
See application file for complete search history.

(56) References Cited

U.S. PATENT DOCUMENTS

| | | | |
|---|---|---|---|
| 2,991,000 | A | 7/1961 | Spees |
| 3,635,216 | A | 1/1972 | Curtis |
| 3,667,459 | A | 6/1972 | Durney |
| 3,681,589 | A | 8/1972 | Roberts |
| 3,802,594 | A | 4/1974 | Lemelson |
| 3,921,224 | A | 11/1975 | Ingram, III |
| 3,946,896 | A | 3/1976 | Lemelson |
| 4,059,852 | A | 11/1977 | Crane |
| 4,271,833 | A | 6/1981 | Moretti |

(Continued)

FOREIGN PATENT DOCUMENTS

| | | | |
|---|---|---|---|
| CA | 2792282 | A1 | 4/2013 |
| CN | 2730167 | Y | 10/2005 |

(Continued)

OTHER PUBLICATIONS

Advisory Action (PTOL-303) Mailed on Mar. 17, 2021 for U.S. Appl. No. 15/934,421.

(Continued)

*Primary Examiner* — Alissa J Tompkins
*Assistant Examiner* — Catherine M Ferreira
(74) *Attorney, Agent, or Firm* — Fredrikson & Byron, P.A.

(57) ABSTRACT

A ventilated hood having an external air flow hose and comprising a filter incorporated in the ventilated hood, and a seal, wherein when the seal is intact, air does not flow through the filter.

17 Claims, 9 Drawing Sheets

(56) References Cited

U.S. PATENT DOCUMENTS

| | | | |
|---|---|---|---|
| 4,310,926 A | 1/1982 | Maroist | |
| 4,460,392 A | 7/1984 | Poulsen et al. | |
| 4,470,413 A | 9/1984 | Warncke | |
| 4,561,162 A * | 12/1985 | Brockway | A62B 17/04 29/428 |
| 4,719,911 A | 1/1988 | Carrico | |
| 4,864,654 A | 9/1989 | Schriver et al. | |
| 4,901,370 A * | 2/1990 | Suda | A62B 17/006 2/457 |
| 5,062,424 A | 11/1991 | Hooker | |
| 5,088,115 A | 2/1992 | Napolitano | |
| 5,201,309 A * | 4/1993 | Friberg | A61M 16/047 128/207.14 |
| H1360 H | 10/1994 | Grove et al. | |
| 5,413,567 A | 5/1995 | Barth et al. | |
| 5,660,169 A | 8/1997 | Kaellstrand et al. | |
| 5,660,269 A | 8/1997 | Fujiwara | |
| 5,937,443 A | 8/1999 | Kageyama et al. | |
| 5,991,921 A | 11/1999 | Saito | |
| 6,076,571 A | 6/2000 | Burns et al. | |
| 6,290,642 B1 | 9/2001 | Reinhard et al. | |
| 6,349,721 B1 | 2/2002 | Grilliot et al. | |
| 6,530,374 B1 | 3/2003 | Ferraro | |
| 6,681,589 B2 | 1/2004 | Brudnicki | |
| 6,758,212 B2 * | 7/2004 | Swann | A62B 17/04 128/206.29 |
| 6,804,836 B2 | 10/2004 | Grilliot et al. | |
| 7,631,364 B2 | 12/2009 | Culler et al. | |
| 7,650,885 B2 | 1/2010 | Paoluccio et al. | |
| 8,074,299 B2 | 12/2011 | Brookman | |
| 8,464,366 B2 | 6/2013 | Carron | |
| 8,476,604 B2 | 7/2013 | Yoder et al. | |
| 9,000,913 B2 | 4/2015 | Patil et al. | |
| 9,186,528 B2 | 11/2015 | Patil et al. | |
| 9,554,604 B2 | 1/2017 | Rippert et al. | |
| 10,004,925 B2 | 6/2018 | Tuffery | |
| 11,027,156 B2 | 6/2021 | Chessari et al. | |
| 2003/0045918 A1 | 3/2003 | Turner et al. | |
| 2003/0140399 A1 | 7/2003 | Golde | |
| 2003/0150232 A1 | 8/2003 | Brudnicki | |
| 2003/0192103 A1 | 10/2003 | Avery et al. | |
| 2003/0221247 A1 * | 12/2003 | Grilliot | A41D 13/0005 2/457 |
| 2004/0138601 A1 | 7/2004 | Chalmers | |
| 2004/0216736 A1 | 11/2004 | Lee et al. | |
| 2004/0226558 A1 | 11/2004 | Kausch | |
| 2004/0237178 A1 * | 12/2004 | Landeros | A62B 17/00 2/457 |
| 2005/0010996 A1 | 1/2005 | Steinert | |
| 2005/0011517 A1 | 1/2005 | Steinert | |
| 2005/0015866 A1 | 1/2005 | Steinert | |
| 2006/0021118 A1 | 2/2006 | Culler et al. | |
| 2006/0048777 A1 | 3/2006 | Brookman | |
| 2006/0070162 A1 | 4/2006 | Frank | |
| 2006/0070612 A1 | 4/2006 | Horton et al. | |
| 2007/0006607 A1 | 1/2007 | Hunt | |
| 2007/0095088 A1 | 5/2007 | Drobot et al. | |
| 2007/0215148 A1 | 9/2007 | Tuffery | |
| 2007/0289050 A1 | 12/2007 | Nocente et al. | |
| 2008/0196140 A1 | 8/2008 | Mayerson et al. | |
| 2009/0235439 A1 | 9/2009 | Cox et al. | |
| 2010/0037891 A1 | 2/2010 | Walker et al. | |
| 2011/0094020 A1 | 4/2011 | Brookman | |
| 2012/0026622 A1 | 2/2012 | Shitara et al. | |
| 2012/0036622 A1 | 2/2012 | Carron | |
| 2012/0066819 A1 | 3/2012 | Carron | |
| 2012/0246809 A1 | 10/2012 | Elam et al. | |
| 2013/0097769 A1 | 4/2013 | Tuffery | |
| 2013/0112211 A1 | 5/2013 | Power et al. | |
| 2013/0269090 A1 | 10/2013 | Liu | |
| 2013/0276217 A1 | 10/2013 | Patil et al. | |
| 2014/0184407 A1 | 7/2014 | Patil et al. | |
| 2015/0033437 A1 | 2/2015 | Hampton | |
| 2015/0250234 A1 | 9/2015 | Tuffery et al. | |
| 2015/0282543 A1 * | 10/2015 | Rippert | A62B 17/005 2/456 |
| 2017/0100613 A1 | 4/2017 | Chessari et al. | |
| 2018/0256924 A1 | 9/2018 | Tuffery | |

FOREIGN PATENT DOCUMENTS

| | | |
|---|---|---|
| CN | 1988936 A | 6/2007 |
| CN | 101001672 A | 7/2007 |
| CN | 103065698 A | 4/2013 |
| DE | 10315607 A1 | 12/2004 |
| EP | 0056613 A2 | 7/1982 |
| EP | 1516645 A2 | 3/2005 |
| EP | 2583721 A2 | 4/2013 |
| EP | 2829304 A1 | 1/2015 |
| EP | 2929913 B1 | 4/2016 |
| EP | 3335765 A1 | 6/2018 |
| ES | 2573852 T3 | 6/2016 |
| FR | 2614538 A1 | 11/1988 |
| FR | 2899488 A1 | 10/2007 |
| FR | 2941624 A1 | 8/2010 |
| GB | 2401553 A | 11/2004 |
| WO | 2006/012475 A2 | 2/2006 |
| WO | 2013/056390 A1 | 4/2013 |

OTHER PUBLICATIONS

Annex to the communication Mailed on Jan. 18, 2021 for EP Application No. 16204513.
Annex to the communication Mailed on Jun. 7, 2023 for EP Application No. 16204513, 4 page(s).
Annex to the communication Mailed on Nov. 7, 2014 for EP Application No. 14163775.
Canada Patent Application No. 2,792,282, Office Action, dated Jun. 26, 2018, 3 pages.
CN Search Report Mailed on Mar. 2, 2016 for CN Application No. 2012103993252.
CN201210399325.2, Notification to Grant Patent Right, dated Aug. 15, 2017, 5 pages.
CN201210399325.2, Office Action, dated Oct. 27, 2016, 20 pages.
CN201210399325.2, Office Action, dated Mar. 10, 2016, 20 pages.
CN201210399325.2, Office Action, dated May 17, 2017, 10 pages.
CN201210399325.2, Office Action, dated Oct. 26, 2016, 20 pages.
Communication from the Examining Division Mailed on Jan. 18, 2021 for EP Application No. 16204513.
Decision to grant a European patent Mailed on Mar. 10, 2016 for EP Application No. 14163775.
EP Office Action Mailed on Jun. 7, 2023 for EP Application No. 16204513, 2 page(s).
EP Office Action Mailed on Nov. 7, 2014 for EP Application No. 14163775.
EP12188062, Decision to Grant, dated Feb. 16, 2017, 2 pages.
EP12188062, European Search Report, dated Jan. 27, 2014, 2 pages.
EP12188062, Examination Report, dated Feb. 26, 2014, 5 pages.
EP12188062, Examination Report.dated Feb. 2, 2014, 5 pages.
EP12188062, Intention to Grant, dated Feb. 16, 2017, 2 pages.
EP12188062, Intention to Grant, dated Nov. 2, 2016, 22 pages.
EP14164775, Partial European Search Report, dated Aug. 7, 2014, 4 pages.
EP16204513.2, Extended European Search Report, mainled May 29, 2017, 10 pages.
European search report Mailed on Oct. 23, 2014 for EP Application No. 14163775.
Final Rejection Mailed on Dec. 23, 2020 for U.S. Appl. No. 15/934,421.
Intention to grant Mailed on Nov. 23, 2015 for EP Application No. 14163775.
Non-Final Rejection Mailed on Dec. 5, 2023 for U.S. Appl. No. 17/237,903, 14 page(s).
Non-Final Rejection Mailed on Jun. 26, 2020 for U.S. Appl. No. 15/934,421.

(56) References Cited

OTHER PUBLICATIONS

Non-Final Rejection Mailed on May 1, 2019 for U.S. Appl. No. 15/382,205.
Notice of Allowance and Fees Due (PTOL-85) Mailed on Apr. 13, 2021 for U.S. Appl. No. 15/382,205.
Notice of Allowance and Fees Due (PTOL-85) Mailed on Apr. 20, 2018 for U.S. Appl. No. 13/278,439.
Notice of Allowance and Fees Due (PTOL-85) Mailed on Aug. 23, 2024 for U.S. Appl. No. 17/237,903, 2 page(s).
Notice of Allowance and Fees Due (PTOL-85) Mailed on Feb. 16, 2021 for U.S. Appl. No. 15/382,205.
Notice of Allowance and Fees Due (PTOL-85) Mailed on Jun. 1, 2021 for U.S. Appl. No. 15/934,421.
Notice of Allowance and Fees Due (PTOL-85) Mailed on Jun. 5, 2018 for U.S. Appl. No. 13/278,439.
Notice of Allowance and Fees Due (PTOL-85) Mailed on Jun. 12, 2024 for U.S. Appl. No. 17/237,903, 8 page (s).
Notice of Allowance and Fees Due (PTOL-85) Mailed on Mar. 2, 2020 for U.S. Appl. No. 15/382,205.
Notice of Allowance and Fees Due (PTOL-85) Mailed on Oct. 5, 2016 for U.S. Appl. No. 14/680,221.
PPS Professional Protection Systems; PPS Product Data Sheet; Nuclear Powered Respirator Suit (NuPo Suit); Paper No. L0041-080711; pp. 1-2.
RESPIREX International Ltd.; Airprotex FM; Product Data Sheet; Feb. 15, 2011; pp. 1-5.
U.S. Appl. No. 14/680,221 Office Action, dated Jun. 13, 2016, 20 pages.
U.S. Appl. No. 13/278,439 Examine's Answer to Appeal Brief, dated Oct. 6, 2015, 10 pages.
U.S. Appl. No. 13/278,439 Notice of Panel Decision from Pre-Appeal Brief Review, dated Jan. 12, 2015, 2 pages.
U.S. Appl. No. 13/278,439, Advisory Action, dated Dec. 1, 2014, 3 pages.
U.S. Appl. No. 13/278,439, Decision on Appeal, dated Sep. 14, 2017, 9 pages.
U.S. Appl. No. 13/278,439, Notice of Allowance, dated Dec. 21, 2017, 7 pages.
Notice of Allowance and Fees Due (PTOL-85) Mailed on Oct. 9, 2024 for U.S. Appl. No. 17/237,903, 5 page(s).
Communication about intention to grant a European patent Mailed on Dec. 9, 2024 for EP Application No. 16204513, 6 page(s).
Decision to grant a European patent Mailed on Apr. 10, 2025 for EP Application No. 16204513, 3 page(s).

* cited by examiner

EMERGENCY FILTER SYSTEM FOR VENTILATED HOOD

CROSS-REFERENCE TO RELATED APPLICATIONS

This application is a continuation application of U.S. patent application Ser. No. 17/237,903, filed Apr. 22, 2021, which is a continuation application of, and claims priority to U.S. patent application Ser. No. 15/382,205 entitled "EMERGENCY FILTER SYSTEM FOR VENTILATED HOOD" filed on Dec. 16, 2016, which is a continuation-in-part (CIP) application of U.S. patent application Ser. No. 13/278,439, filed Oct. 21, 2011, entitled "Emergency Filter System for Encapsulated Suit," by Swan Tuffery, and which is related to and claims priority to Europe Patent Application No. EP16204513.2, filed Dec. 15, 2016, entitled "Emergency Filter System for Ventilated Hood" by Christophe Chessari et al., each of which are incorporated herein by reference in their entireties.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Protective suits may be worn in contaminated areas to protect the wearer of the suit. For example, workers may wear a protective suit while working inside of a nuclear powered electrical generating plant or in the presence of radioactive materials. A protective suit may be a one-time use type of system, wherein after a single use the suit is disposed of. A protective suit may receive breathing air during normal operating conditions via an external air flow hose connected to the suit. The air may be supplied, for example, by a powered air purifying respirator (PAPR) that may be carried by the user.

SUMMARY

In an embodiment, a protective suit is disclosed. The protective suit comprises an external air flow hose, a filter incorporated in the protective suit, and a seal, wherein when the seal is intact, air does not flow through the filter.

In another embodiment, a ventilated hood is disclosed. The ventilated hood comprises an external air flow hose coupled to the ventilated hood, a filter incorporated in the ventilated hood, the filter having an exterior face and an interior face, where the exterior face of the filter faces towards an exterior of the ventilated hood and wherein the interior face of the filter faces towards an interior of the ventilated hood, a first seal coupled to one of the exterior of the ventilated hood or the exterior face of the filter, a head enclosure, and a collar coupled to the external air flow hose and configured to inflate in response to air flow in the external air flow hose to impede infiltration of contaminants from an external environment to an interior of the head enclosure.

In an embodiment, a method of using a ventilated hood is disclosed. The method comprises donning a ventilated hood, the ventilated hood having an external air flow hose, a filter incorporated in the ventilated hood, and a first seal, wherein when the first seal is intact, air does not flow out through the filter from an interior of the ventilated hood, after donning the ventilated hood, breaching the first seal, and after breaching the first seal, inhaling air received from the filter.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Figure 1:
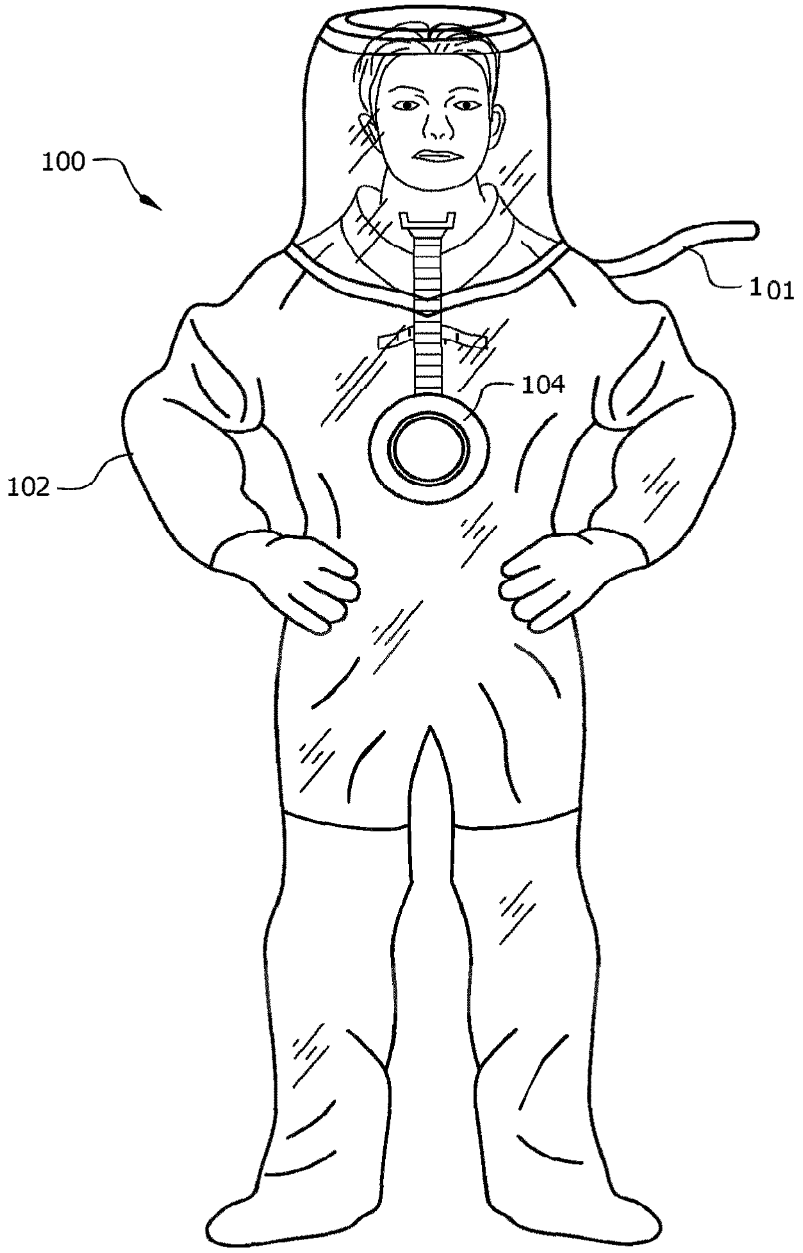
FIG. 1 illustrates an encapsulated protective suit according to an embodiment of the disclosure.

Turning now to FIG. 1, an encapsulated protective suit 100 is described. In an embodiment, the protective suit 100 having an external air flow hose 101, comprises a skin 102 and a first emergency breathing apparatus 104. In an alternative embodiment, the encapsulated protective suit 100 may comprise a different emergency breathing apparatus. The user dons or puts on the encapsulated protective suit 100 and may further don or put on booties, shoes, or boots on the feet to protect the integrity of the feet of the encapsulated protective suit 100 and gloves to seal the encapsulated protective suit 100 at the hands. The encapsulated protective suit 100 may be a fully encapsulated protective suit. Air for breathing under normal operating conditions may be provided by an external air flow hose 101 coupled to the encapsulated protective suit 100, for example an external air flow hose 101 coupled to a powered air purifying respirator device (not shown), and air within the encapsulated protective suit 100 is breathed by the user. In an embodiment, an exhaust valve (not shown) coupled to the encapsulated protective suit 100 allows air to leave the suit, possibly maintaining an appropriate pressure differential. The encapsulated protective suit 100 may be used in any contaminated environment, for example a workplace having radioactive materials and/or a nuclear powered electrical power generation facility. The encapsulated protective suit 100 may be used as well in other contaminated environments. It is understood that in different embodiments the encapsulated protective suit 100 may take different forms from that illustrated in FIG. 1. While illustrated as centered in FIG. 1, the first emergency breathing apparatus 104 may be offset to either side of a center of the encapsulated protective suit 100 and/or moved up or down.

While using the encapsulated protective suit 100 in the contaminated environment, in an embodiment, it is preferred that a positive pressure differential be maintained between the interior and exterior of the encapsulated protective suit 100. This positive pressure differential may provide a margin of safety, in that if a minor breach of the skin 102 occurs, contaminated material is not likely to enter the encapsulated protective suit 100 but rather may be discouraged from entry by air flowing from the interior to the exterior of the encapsulated protective suit 100 at the location of the minor breach. Generally it is desired that the encapsulated protective suit 100 be relatively air-tight, with the exception of the exhaust valve described above, to promote efficiency. For example, if the normal air supply is provided by a powered air purifying respirator that is battery powered, a low efficiency encapsulated protective suit—that is a suit that has unnecessary air escape points—may cause the powered air purifying respirator to work harder to maintain the desired pressure differential and may prematurely discharge the battery. Alternatively, an inefficient suit may entail using a heavier battery in the powered air purification respirator and the disadvantages associated with excess weight.

When the powered air purifying respirator or other source of air flow fails, the user of the encapsulated protective suit 100 may employ the first emergency breathing apparatus 104 to breathe safely. It is expected that the user of the encapsulated protective suit 100, when normal air flow fails, will begin returning to a safe area shortly after the normal air flow source fails, and hence it is contemplated that the first emergency breathing apparatus 104 will be used for relatively short time intervals, for example for less than 2 minutes, for less than 6 minutes, or for less than 10 minutes.

Figure 2:
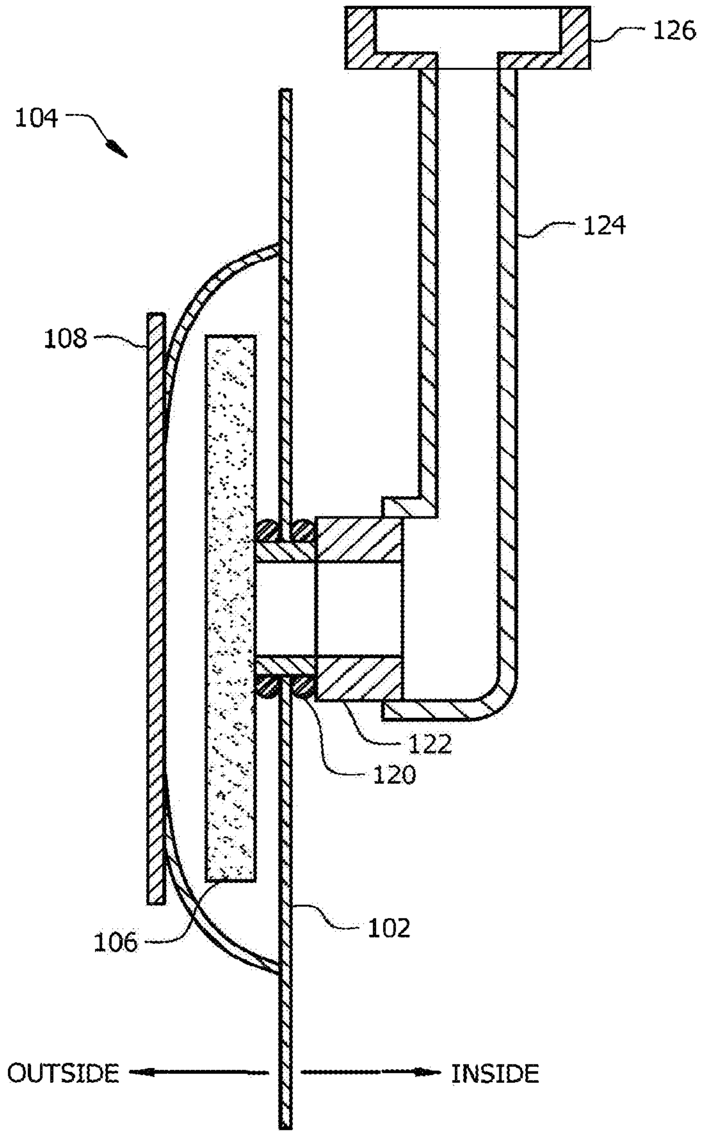
FIG. 2 illustrates an emergency air breathing apparatus for use with an encapsulated protective suit according to an embodiment of the disclosure.

Turning now to FIG. 2, the first emergency breathing apparatus 104 is discussed. In an embodiment, the first emergency breathing apparatus 104 comprises a filter 106, a seal 108, a filter coupling 120, a breathing pipe coupling 122, a breathing pipe 124, and a mouth piece 126. It is understood that the first emergency breathing apparatus 104 may comprise other components that are not illustrated or described herein. The first emergency breathing apparatus 104 and/or the filter 106 may be said to be incorporated into the skin 102 of the encapsulated protective suit 100. Additionally, the view presented in FIG. 2 is schematic and not intended to represent relative sizes or scale of the illustrated components. The inside of the encapsulated protective suit 100 is to the right of the skin 102 and the outside of the encapsulated protective suit 100 is to the left of the skin 102 as illustrated in FIG. 2. The outside of the encapsulated protective suit 100 may be referred to in some contexts as the exterior of the encapsulated protective suit 100 and the inside of the encapsulated protective suit 100 may be referred to in some contexts as the interior of the encapsulated protective suit 100.

Under normal operation, that is when the user of the encapsulated protective suit 100 is breathing air provided via an external air flow hose 101, the seal 108 blocks flow into and out of the filter 106. This blockage by the seal 108 contributes to the air-tightness of the encapsulated protective suit 100 and promotes the efficiency of the encapsulated protective suit 100. When emergency air supply is needed, the seal 108 is torn at least partially free of the skin 102 and/or free of the filter 106, opening a pathway for air to flow in through the filter 106, through the couplings 120, 122, up the breathing pipe 124, to the mouth piece 126. The portion of the filter 106 facing to the left in FIG. 2 may be referred to as an exterior face or an outside face of the filter 106; the portion of the filter 106 facing to the right in FIG. 2 may be referred to as an interior face or an inside face of the filter 106.

In an embodiment, the filter 106 may be a pancake type filter. Pancake type filters are known in the art and may take a variety of different forms. In an embodiment, a pancake type filter may be substantially cylindrical in shape where the height of the cylinder is much less than the width or diameter of the cylinder. For example, in an embodiment, the height of the cylinder may be less than 20% of the width or diameter of the cylinder. Alternatively, in an embodiment, the height of the cylinder may be less than 10% of the width or diameter of the cylinder. While pancake filters may be generally circular in section, in an embodiment, the pancake filter may be polygonal in section or elliptical in section. In an embodiment, the filter 106 may be a P3 filter. Alternatively, in an embodiment, the filter 106 may be a P2 filter. Alternatively, in an embodiment, the filter 106 may be a P1 filter. As is known by one skilled in the art, a P3 filter may filter at least 99.95% of airborne particles; a P2 filter may filter at least 94% of airborne particles; and a P1 filter may filter at least 80% of airborne particles. In other embodiments, however, the filter 106 may be a different filter.

Figure 3A:
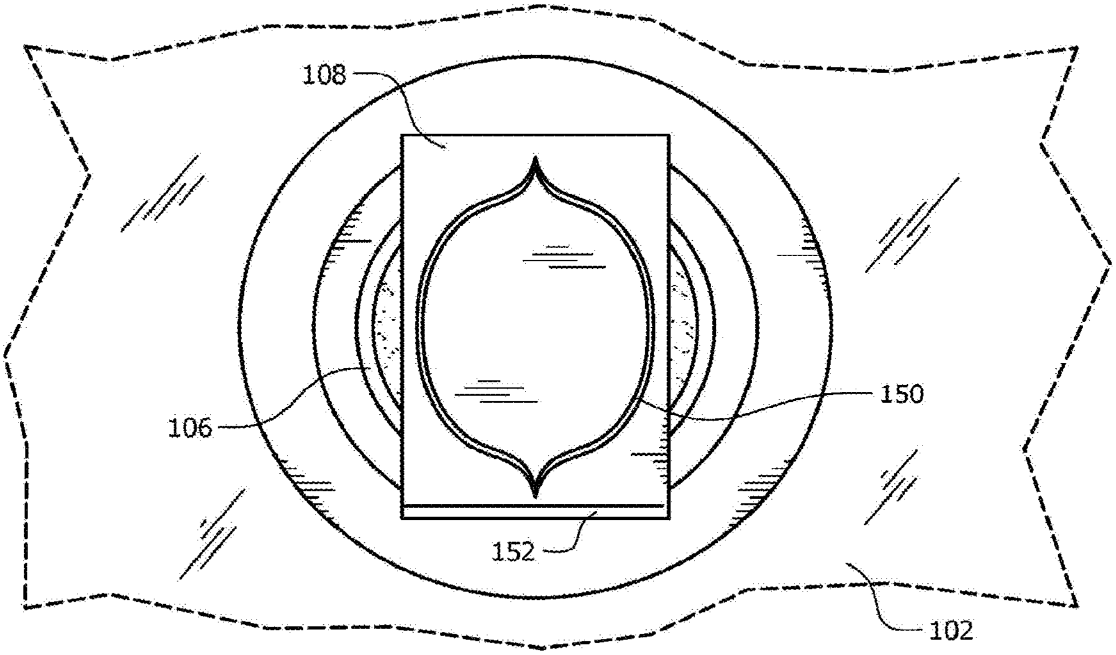
FIG. 3A illustrates a sealed air filter according to an embodiment of the disclosure.
Figure 3B:
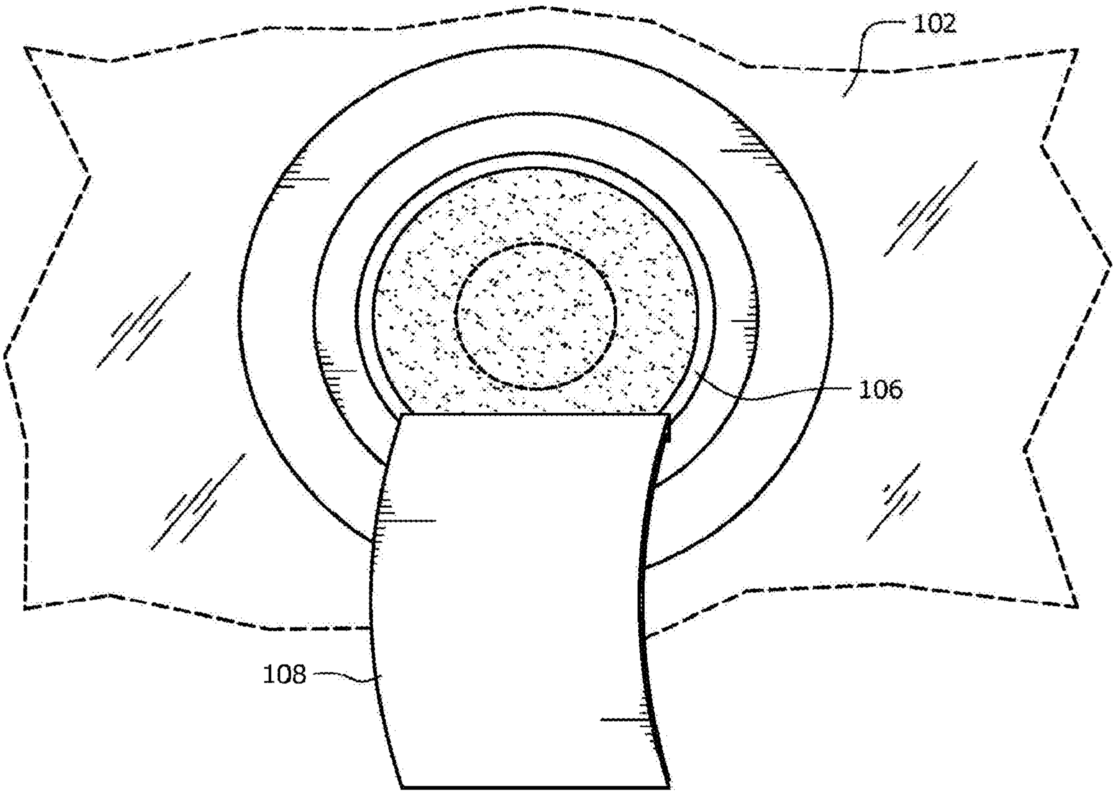
FIG. 3B illustrates an unsealed air filter according to an embodiment of the disclosure.

Turning now to FIG. 3A and FIG. 3B, further details related to the seal 108 and the filter 106 are described. In an embodiment, the seal 108 is secured in a sealing position by a tearable weld 150. In other embodiments, however, another means may be used to secure the seal 108, for example an adhesive. Tearable welds and non-tearable welds are generally known in the art. Without limitation, a tearable weld may be distinguished as being an attachment or coupling between two structures that yields or releases when a first one of the structures is pulled away from the second structure before either structure is damaged. By contrast, without limitation, a non-tearable weld may be distinguished as being an attachment or coupling between two structures such that damage to one of the structures is likely to occur if a first one of the structures is pulled away from the second structure before the non-tearable weld yields.

When the user of the encapsulated protective suit 100 wishes to use the first emergency breathing apparatus 104, the user may grasp the edge of the seal 108 and tear it downwards to breach the seal between the skin 102 and/or the filter 106 and the seal 108. It is understood that the term seal may be used to refer to the structure seal 108 that in part establishes a seal, meaning a barrier, between the exterior and interior of the encapsulated protective suit 100 as well as to refer to the state of the existence of the barrier. When the seal 108 blocks flow into and out of the filter 106, the seal established between the seal 108 and the skin 102 and/or the filter 106 may be said to be intact. In an embodiment, the seal 108 may also be secured to the skin 102 and/or the filter 106 by a non-tearable weld 152 or other structure. As shown in FIG. 3B, when the seal 108 is torn free from the tearable weld 150 to open the first emergency breathing apparatus 104, the non-tearable weld 152 may retain the seal 108 coupled to the encapsulated protective suit 100 so that the seal 108 is not separated. If the seal 108 were completely separated, it may fall and create a foreign material incident (FMI) in a contaminated area. In another embodiment, however, the seal 108 may not be retained by the non-tearable weld 152.

Figure 3C:
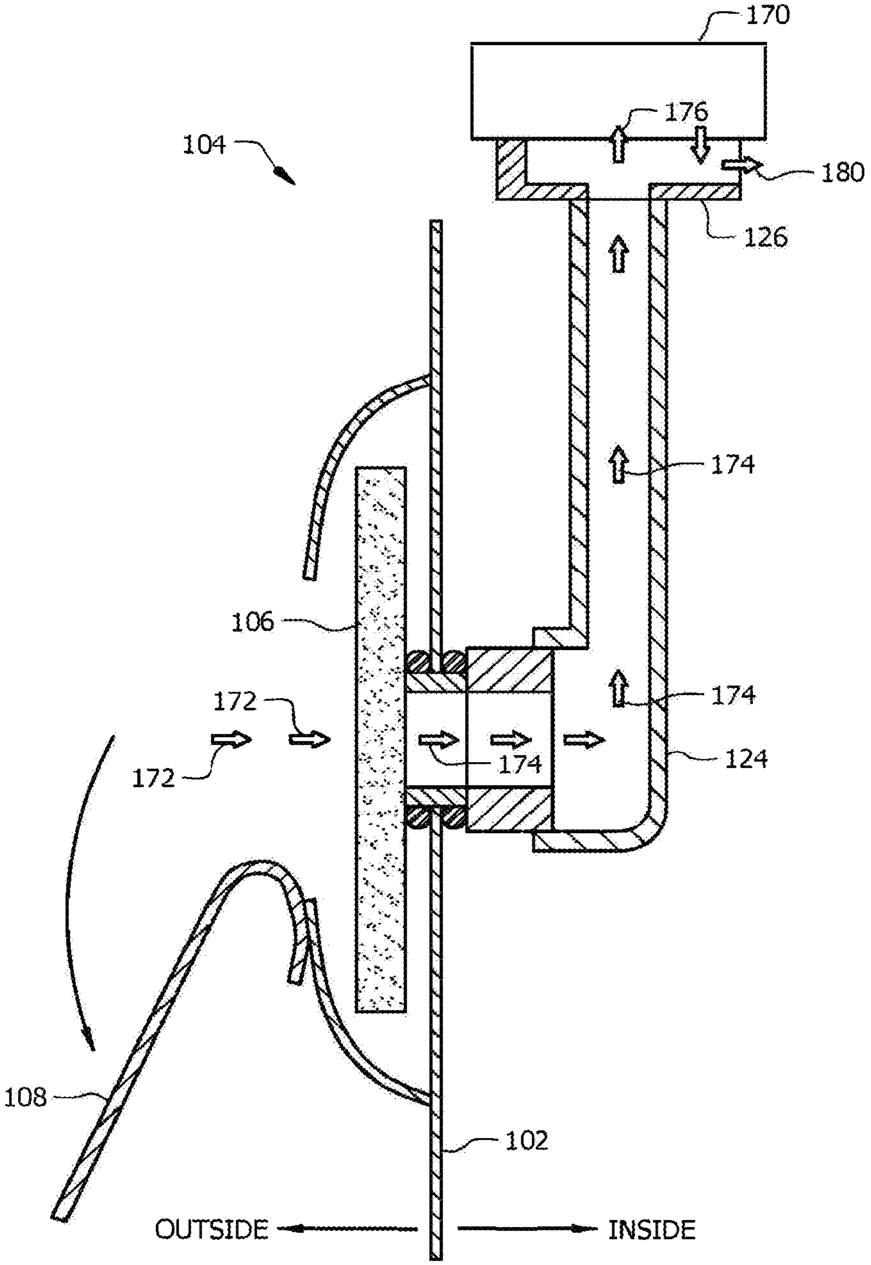
FIG. 3C illustrates an air flow of an emergency air breathing apparatus coupled to an encapsulated protective suit according to an embodiment of the disclosure.

Turning now to FIG. 3C, the flow of air using the first emergency breathing apparatus 104 is described. As illustrated in FIG. 3C, the seal 108 has been torn free from the tearable weld 150 and is retained by the non-tearable weld 1521. Exterior air flow 172 enters the filter 106, breathing pipe air flow 174 proceeds through the breathing pipe 124 to the mouth piece 126 where emergency filtered air flow 176 is breathed by the user 170. The exhaled air flow 180 escapes from the mouth piece 126 either through an outflow valve or through user control of exhaled air. In an embodiment, a one-way air flow valve (not shown) may be incorporated in the first emergency breathing apparatus 104 to permit flow through the filter 106 from the outside to the inside, as illustrated in FIG. 3C, and to substantially block flow through the filter 106 from the inside of the encapsulated protective suit 100 to the outside of the encapsulated protective suit 100. The view presented in FIG. 3C is schematic and not intended to represent relative sizes or scale of the illustrated components.

Figure 4:
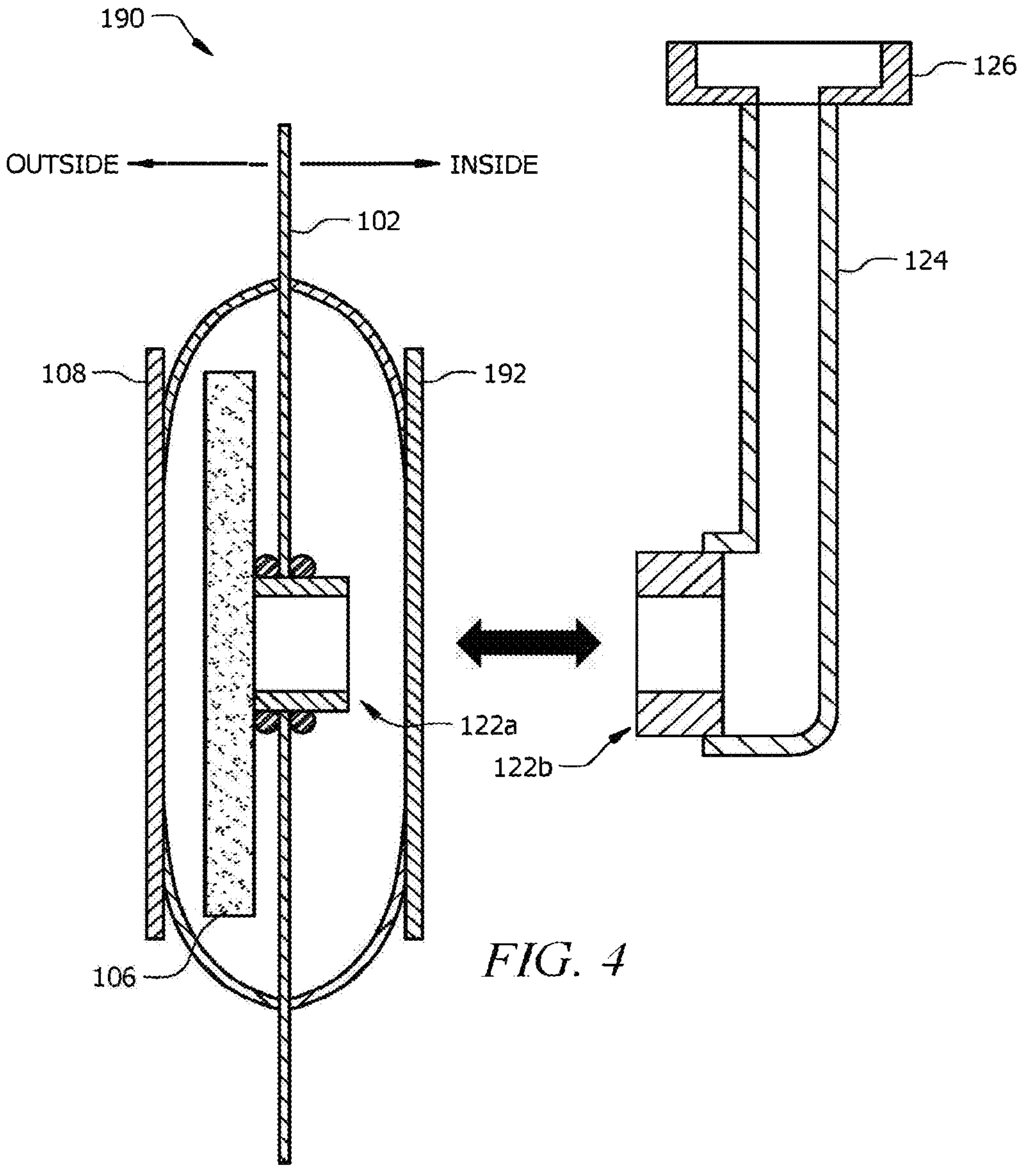
FIG. 4 illustrates an emergency air breathing apparatus for use with an encapsulated protective suit according to another embodiment of the disclosure.

Turning now to FIG. 4, a second emergency breathing apparatus 190 is described. Some of the features of the second emergency breathing apparatus 190 are substantially similar to those of the first emergency breathing apparatus 104 described above. The view presented in FIG. 4 is schematic and not intended to represent relative sizes or scale of the illustrated components.

The filter 106 used in the second emergency breathing apparatus 190 may be a moisture laden or moisture bearing filter. The principle of operation of the filter 106 used in the second emergency breathing apparatus 190 may depend upon the moisture contained within the filter 106. For example, the filter 106 in the second emergency breathing apparatus 190 may be a tritium filter. As is known to those skilled in the art, tritium is a radioactive isotope of hydrogen that may be encountered in nuclear reactor work environments and poses significant health risks to workers who may inhale tritium. To assure that the filter 106 in the second emergency breathing apparatus 190 remains moist, the filter 106 may be sealed in the encapsulated protective suit 100 on both an exterior and interior of the encapsulated protective suit 100. Thus, the seal 108 may be coupled to the exterior of the skin 102 and/or the exterior of the filter 106, and the seal 192 may be coupled to the interior of the skin 102 and/or the interior of the filter 106.

Before donning the encapsulated protective suit 100, a user may tear down the seal 192. After tearing down the seal 192, the user may couple the filter air coupler 122*a* with the breathing pipe air coupler 122*b*. Then when the user needs to employ the second emergency breathing apparatus 190, for example in emergency breathing situation, the user tears open the seal 108 and breathes through the mouthpiece 126 as described above with reference to the first emergency breathing apparatus 104. In an embodiment, a one-way air flow valve (not shown) may be incorporated in the second emergency breathing apparatus 190 to permit flow through the filter 106 from the outside of the encapsulated protective suit 100 to the inside of the encapsulated protective suit 100, and to substantially block flow through the filter 106 from the inside of the encapsulated protective suit 100 to the outside of the encapsulated protective suit 100.

It is understood that the above teachings can be applied to protective suits of various form factors. In general, the protective suit has a skin that provides some kind of barrier between the outside, possibly contaminated environment, and an inside where the human wearer of the protective suit is vulnerable to the subject contaminants. The contaminants may be radioactive particulate matter, chemical particulate matter, asbestos, or other contaminants. As examples and without limitation, the work environment in which protective suits may desirably be used may be nuclear power plants, radioactive materials handling facilities (e.g., medical materials such as radioactive sources for diagnostic imaging and radioactive materials for cancer treatments, radioactive sources for smoke detection), pharmaceutical production plants, chemical factories, oil refineries, asbestos removal projects, and others. In some cases, the contaminants may be gases or air borne liquids (e.g., aerosols).

The protective suit may be composed partly of ordinary clothing and partly of a breathing apparatus that encloses the human's head. For example, the protective suit may be composed of ordinary shoes, ordinary socks, ordinary pants, ordinary shirt, and a breathing hood that covers the head and comprises a cowl that extends down over the shoulders and chest. The protective suit may be composed of ordinary shoes, ordinary socks, a jump suit or overall having leg cuffs that secure closely at the ankles or lower calves and a breathing hood.

Some contaminants pose little health hazard on the outside skin of a human being but may be very hazardous when inhaled. For example, alpha particles emit low energy radiation which does not readily penetrate skin. Thus, alpha particles on the outside skin of a human being may pose little health risk. These same alpha particles, however, can pose significant long term health risks to human beings when inhaled. For example, inhalation of alpha particles may increase long term risk of developing lung cancer. Managing the risk of worker exposure to alpha particles may focus on reducing or preventing inhalation by the worker of alpha particles and washing alpha particles off of the skin of the human worker and off of the clothing of the human worker.

Figure 5A:
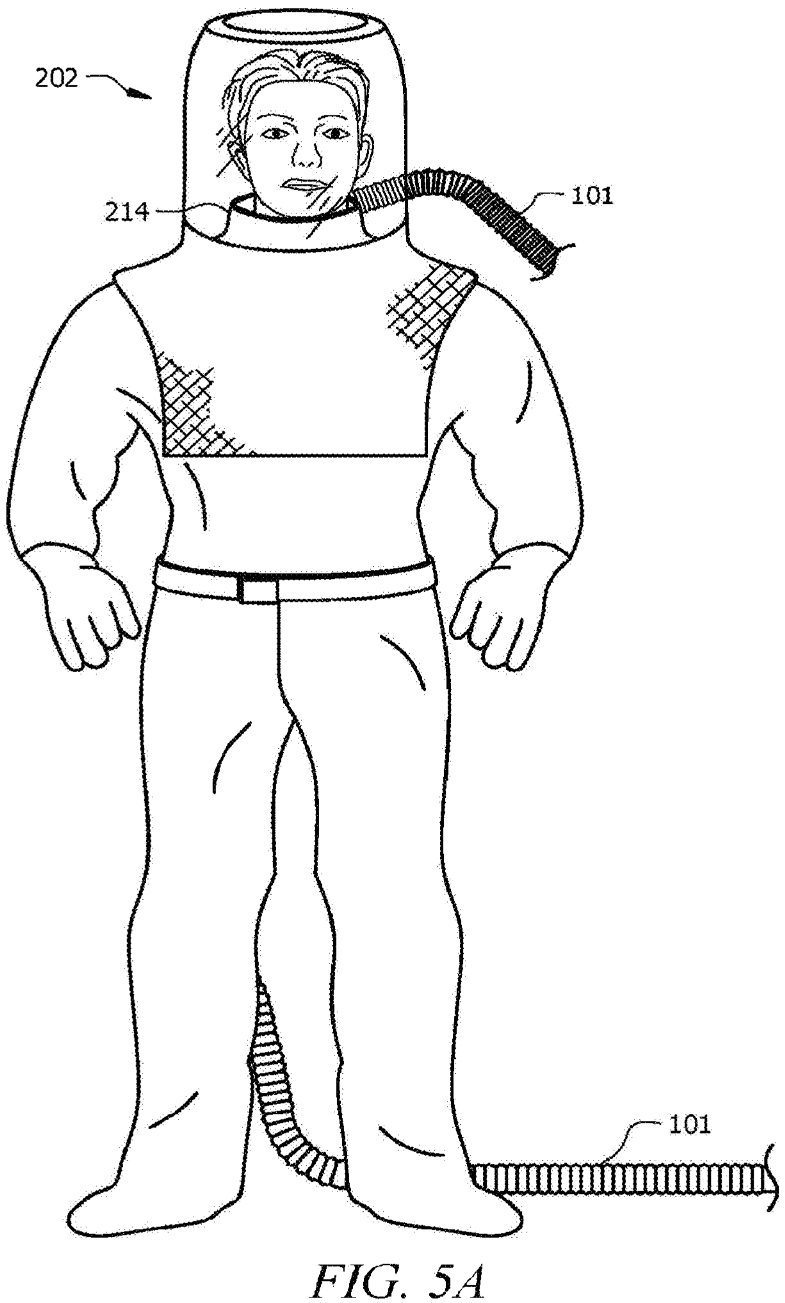
FIG. 5A and FIG. 5B illustrate a ventilated hood worn by a human being according to embodiments of the disclosure.
Figure 5B:
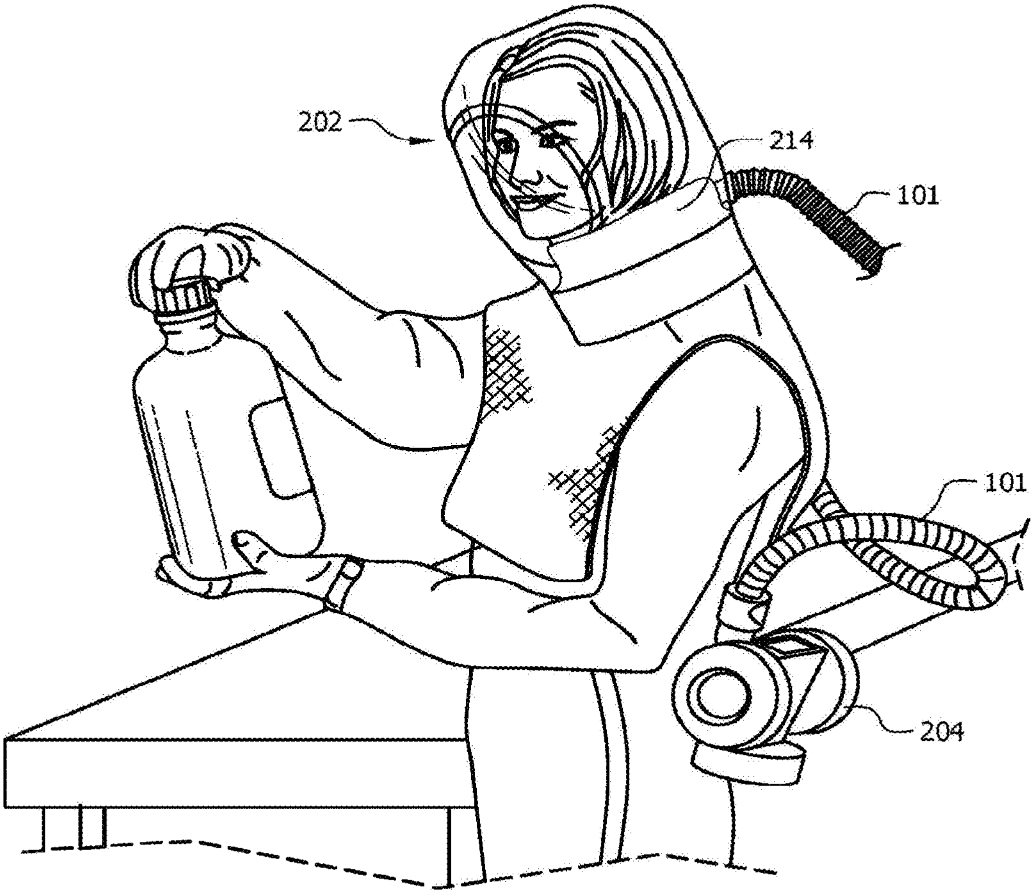

Turning now to FIG. 5A and FIG. 5B, a ventilated hood 202 is described. In some circumstances, a ventilated hood 202 may be preferred to an encapsulated suit 100. For example, the ventilated hood 202 may provide more freedom of movement (e.g., less encumberance) than the encapsulated suit 100, for example in a less hazardous work environment where the greater protection of the encapsulated suit 100 may not be mandatory. Additionally, for use in a less hazardous work environment where the greater protection of the encapsulated suit 100 is not mandatory, the use of the ventilated hood 202 may provide a costs savings versus workers using an encapsulated suit 100.

The ventilated hood 202 (e.g., a breathing hood) in FIG. 5A is provided with the air flow hose 101 that is connected to a tap of a breathable air network provided in the work environment. The breathable air network provides clean, contaminant free air to the air flow hose 101 to be breathed by the human being. The ventilated hood 202 in FIG. 5B is provided with the air flow hose 101 that is connected to a powered air purifying respirator (PAPR) device 204. The PAPR device 204 may incorporate a filter that filters out contaminants from the ambient air in the work environment before feeding it through the air flow hose 101 into the ventilated hood 202 to be breathed by the human being. In different work environments, either the configuration of FIG. 5A or the configuration of FIG. 5B may be preferred.

The ventilated hood 202 comprises a collar 214 that is coupled to the air flow hose 101 and is configured to inflate in response to the air flow in the air flow hose 101. When inflated, the collar 214 impedes and/or reduces infiltration of contaminants from the outside environment into the inside of the ventilated hood 202. In an embodiment, the ventilated hood 202 may comprise a one-way exhaust valve (not shown) that allows air to pass from the inside of the ventilated hood 202 to the outside environment but blocks passage of air from the outside environment into the inside of the ventilated hood 202. Alternatively or in addition, the flow of air from the air flow hose 101 into the ventilated hood 202 may exhaust out through gaps between the ventilated hood 202, the collar 214, and the clothing of the human being. The flow of air from the air flow hose 101 may provide a positive pressure differential between the inside of the ventilated hood 202 and the exterior of the ventilated hood 202, whereby contaminants may tend to be excluded from casual infiltration inside the ventilated hood 202. Such pressures may serve to correctly inflate the collar 214 to ensure a balance between pressure applied, such as to a user, and sealing efficiency.

The collar 214 may be referred to in some contexts by other equivalent terms such as a baffle or inflatable baffle, a flange or an inflatable flange, a bulkhead or an inflatable bulkhead. When the air flow hose 101 is unable to supply breathable air to the ventilated hood 202, for example in an emergency circumstance or when disconnected from a breathable air network to leave the work environment, the collar 214 may deflate and may no longer impede infiltration of contaminants from the outside environment into the inside of the ventilated hood 202. This is one reason why the emergency breathing apparatus 104, 190 is desirably provided for the ventilated hood 202. Another reason is that $CO_2$ levels may build to a dangerous level within the ventilated hood 202 if no alternative source of breathable air is provided. A full-face mask with filter may provide an alternative to the ventilated hood 202, but workers may find the full-face mask to be uncomfortable and distracting in comparison to the ventilated hood 202. The use of the protective encapsulated protective suit 100 may be preferred in a work environment with a higher concentration of contaminants, while the use of the ventilated hood 202 may be preferred in a work environment with a moderate to low concentration of contaminants. The collar 214 may be configured to both receive incoming air and to leak that air in a controlled manner such that removal of inflating air can deflate the collar and thus avoid potential suffocation. In an embodiment, the leak or outlet may be smaller in dimension than the air inlet or may incorporate a valve that modulates to maintain a preferred pressure differential.

The ventilated hood 202 may be a single use protective device or it may be a limited use protective device. A limited use protective device may be used two times or three times before it is discarded. The ventilated hood 202 may be inspected to determine if it is suitable for continued limited use or whether it should be discarded. If the expected contaminants in the work environment are radioactive contaminants, the ventilated hood 202 may be inspected with a Geiger counter or with another radiation sensitive measuring device. If the expected contaminants in the work environment are chemicals or asbestos, the ventilated hood 202 may be visually inspected by the human user and discarded if it looks visibly dirty.

In an embodiment, the emergency breathing apparatus 104, 190 may be removable from the encapsulated protective suit 100 or removable from the ventilated hood 202. For example, the emergency breathing apparatus 104, 190 may be coupled to the protective suit 100 (e.g., the skin 102 of the encapsulated protective suit 100) or to the ventilated hood 202 (e.g., a cowl 2122 of the ventilated hood 202) with a tearable weld or by an adhesive joint. A human user may exit a contaminated work area and enter a changing room. In the changing room, the human user may activate breathing using the emergency breathing apparatus 104, 190, remove the emergency breathing apparatus 104, 190 from the encapsulated protective suit 100 or ventilated hood 202, doff (e.g., take off) the encapsulated protective suit 100 or ventilated hood 202, discard the doffed encapsulated protective suit 100 or ventilated hood 202, and exit the changing room to a clean area. In the clean area, the human user may discard the emergency breathing apparatus 104, 190 and begin breathing unfiltered air. It is understood that the changing area may have some low level contamination. In some contexts, the changing room may be referred to as an intermediate changing room or by some other name. The human user may further remove work clothes such as work boots, work gloves, work pants, work shirt, or overalls while in the changing room.

Figure 6B:
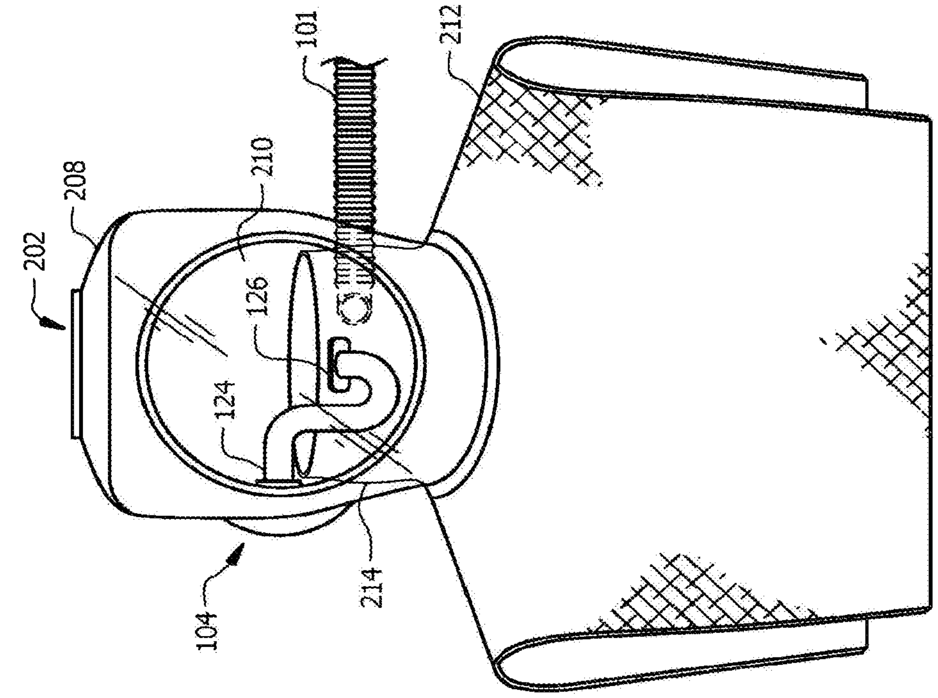
FIG. 6A and FIG. 6B illustrate aspects of a ventilated hood according to embodiments of the disclosure.
Figure 6A:
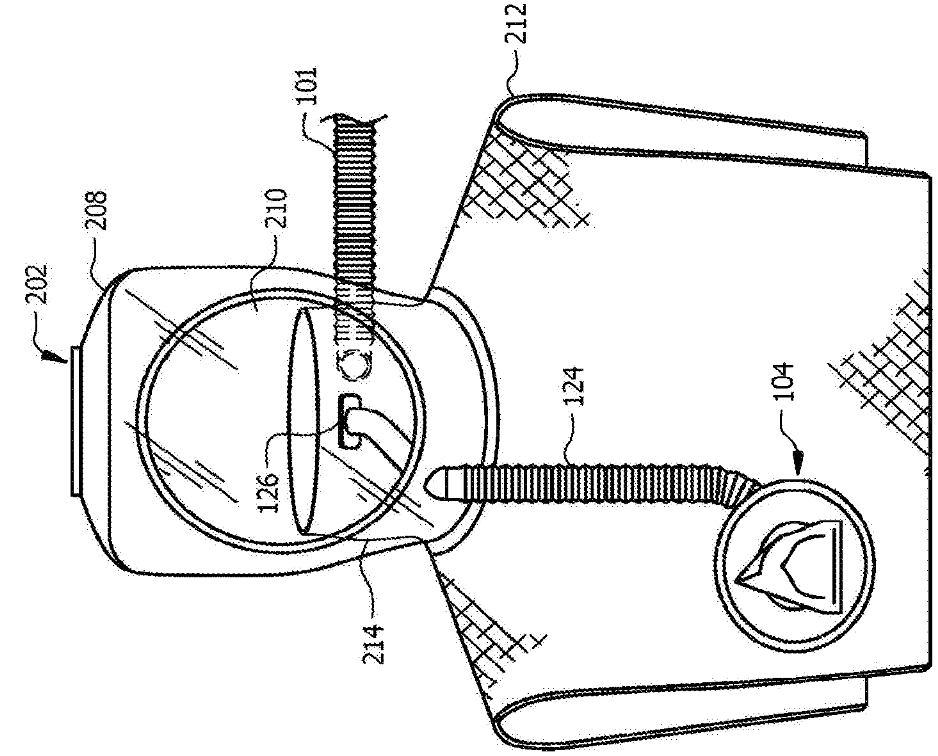

Turning now to FIG. 6A, further details of the ventilated hood 202 are described. In an embodiment, the ventilated hood 202 comprises a head enclosure 208 having a viewing window 210 and the collar 214. The air flow hose 101 is coupled to the ventilated hood 202 and the collar 214 in such a way as to both supply breathable air to the inside of the ventilated hood 202 and to cause the collar 214 to inflate and impede infiltration of contaminants from the outside environment to the inside of the ventilated hood 202. The collar 214, when inflated in this way, may be said to seal, at least partially, gaps between the head enclosure 208 and the neck of the human user of the ventilated hood 202. The head enclosure 208 and collar 214, when the collar 214 is inflated, completely protect the head from contamination in the outside environment while the body of the human user is unprotected (e.g., unprotected by the ventilated hood 202: the body may be protected from contamination in the outside environment by other articles of clothing such as a work overalls, work boots, work gloves and the like). In an embodiment, the collar 214 assumes the form of a toroidal tube when inflated. In an embodiment, the collar 214 is connected to the skin 102 and is located proximal and/or coaxial with the neck position of a user when wearing the ventilated hood 202.

The head enclosure 208 may comprise opaque material or transparent material. The head enclosure 208 may be at least partly stiff and impact resistant. The viewing window 210 provides a transparent window that promotes the human being seeing the exterior of the ventilated hood 202, for example to see a work environment. The viewing window 210 may be a plastic material. The viewing window 210 may be a flexible plastic material. In an embodiment, the head enclosure 208 may comprise polyvinyl chloride (PVC). In an embodiment, the viewing window 210 may comprise crystal PVC.

In some embodiments, but not all embodiments, the ventilated hood 202 further comprises a cowl 212 configured to rest on the top of the human being's shoulders and to drape down below the crest of the shoulders, over the chest and over the back of the human being. Such a cowl 212 is part of the skin 102 and is coupled to the head enclosure 208. In some contexts, the cowl 212 may be referred to with other roughly equivalent terms such as apron or cape. The cowl 212 may provide protection from splashes, projections (squirting or spraying), and/or spills of contaminants such as chemicals. The cowl 212 may comprise PVC or another plastic or rubberized fabric. In an embodiment, the cowl 212 may be white or colored. For example, in some nuclear power plants pink color may be used to prompt proper disposal of items that may be deemed contaminated.

The ventilated hood 202 further comprises the first emergency breathing apparatus 104, the breathing pipe 124, and the mouth piece 126 described above. It is understood that in an embodiment, the ventilated hood 202 comprises the second emergency breathing apparatus 190 described above rather than the first emergency breathing apparatus 104. In emergency circumstances (e.g., when the air flow hose 101 is unable to provide breathable air for any reason), the emergency breathing apparatus 104, 190 provides filtered breathable air to the human being. In some circumstances, for example in the changing room as described above, the emergency breathing apparatus 104, 190 may provide filtered breathable air to the human being (e.g., the user) while he or she is doffing the encapsulated protective suit 100 or the ventilated hood 202.

The cowl 212 and/or the head enclosure 208 may be said to comprise a skin of the ventilated hood 202. The emergency breathing apparatus 104, 190 may be said to be incorporated into the ventilated hood 202, into the cowl 212, into the head enclosure 208, and/or into the skin of the ventilated hood 202. The emergency breathing apparatus 104, 190 may be removable from the cowl 212 or from the head enclosure 208.

In FIG. 6A, the emergency breathing apparatus 104 is illustrated located in a front or chest area of the cowl 212, but the emergency breathing apparatus 104 may be located in different areas of the ventilated hood 202, for example in a back area of the cowl 212, in a right shoulder top area of the cowl 212, in a left shoulder top area of the cowl 212, or elsewhere. See the above descriptions for further details of the emergency breathing apparatus 104, 190.

The cowl 212 may extend any distance down over the chest and back. In an embodiment, the cowl 212 may comprise at least partially enclosing sleeves. In such an embodiment, the enclosing sleeves may comprise closures such as buttoned cuffs, draw strings, Velcro closures, and the like, to at least partially seal the sleeves against the arms or hands of the human being. In such an embodiment, the enclosing sleeves may comprise elastic material that automatically pulls the end of the sleeves together to seal at least partially against the arms or hands of the human being. In an embodiment, the cowl 212 may comprise draw strings to secure the cowl 212 to the torso of a human being. In an embodiment, the cowl 212 may comprise elastic material that automatically pulls the edges of the cowl 212 close to the torso of the human being.

Turning now to FIG. 6B, an alternative location of the emergency breathing apparatus 104, 190 is described. In an embodiment, the emergency breathing apparatus 104, 190, may be located in a side of the head enclosure 208 and the breathing pipe 124 may wrap around an interior of the head enclosure 208 to be proximate to and accessible to a human mouth for use in emergency breathing scenarios. In an embodiment, the emergency breathing apparatus 104, 190 may filter particulate contamination. In an embodiment, the first emergency breathing apparatus 104 and/or the second emergency breathing apparatus 190 may filter chemical contamination. For example, the filter 106 may feature, at least in part, a filter medium that interacts with and bonds chemical contamination thereby removing at least part of the chemical contamination from air passed through the filter 106 to the breathing pipe 124 to the mouthpiece 126 to be breathed by a human being. The filter 106 may comprise a charcoal filter medium. In an embodiment, the filter 106 may comprise an adsorbent medium. In an embodiment, the filter 106 may comprise an absorbent medium.

Figure 7A:
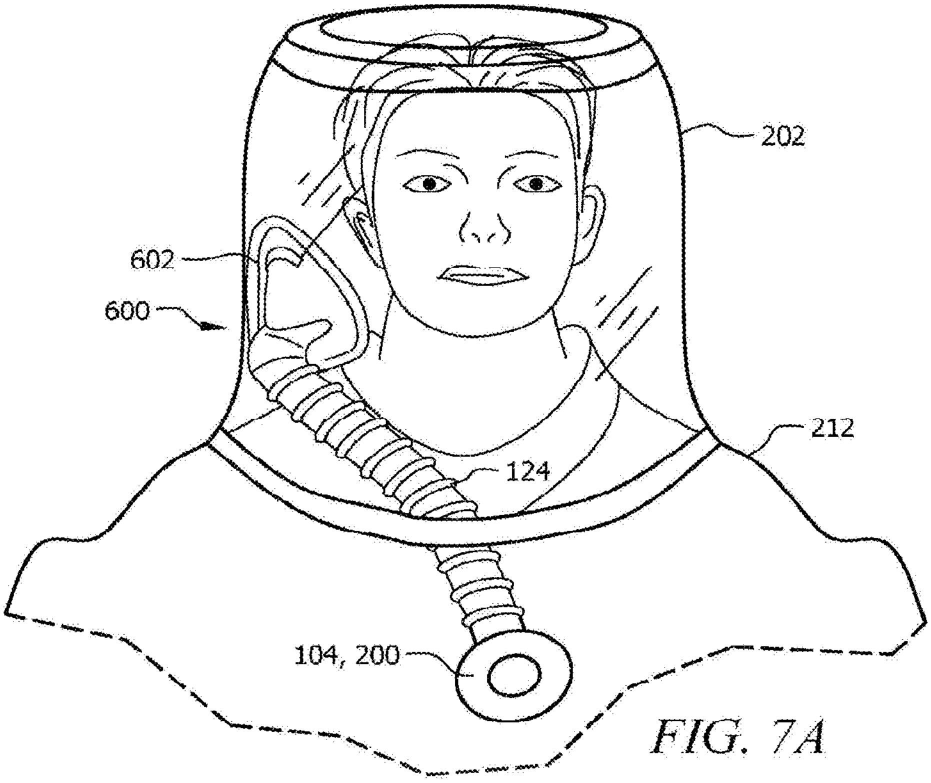
FIG. 7A and FIG. 7B illustrate aspects of a ventilated hood according to embodiments of the disclosure.

Turning to FIG. 7A, an embodiment of the emergency breathing apparatus 104, 190 is described as having a different interface for breathing 600. The remainder of the emergency breathing apparatus can be the same as or similar to any of the embodiments disclosed with respect to FIGS. 2-6B. In this embodiment, the mouthpiece of the interface for breathing 600 can be in the form of a facepiece 602 that is operable to fit over the nose and mouth of a user. The facepiece 602 may comprise a molded material, wherein the edge of the facepiece 602 may seal against the user's face whenever the facepiece 602 is worn. In some embodiments, a user may hold the facepiece 602 against their face by holding a mouthpiece in their mouth. The breathing pipe 124 may fit through an opening in the facepiece 602, and may be sealed so that no air can pass into the facepiece 602 other than through the breathing tube 124 when it is worn by a user.

The facepiece 602 may comprise a transparent material. In some embodiments, the facepiece 602 may comprise a rigid material. In some embodiments, the facepiece 602 may comprise a flexible material. In some embodiments, the facepiece 602 may comprise a general shape designed to fit on the face of a user. In some embodiments, the facepiece 602 may comprise a customized shape for a specific user. In some embodiments, the facepiece 602 may comprise one of a plurality of general shapes or sizes, such as small, medium, and large. In some embodiments, the facepiece 602 may comprise a nose clip operable to fit over the nose of a user. In some embodiments, the nose clip may fit tight enough on a user's nose to effectively close the use's nose, thereby allowing the user to only breathe through their mouth. In some embodiments, the facepiece 602 may comprise an exhalation valve.

The mouthpiece as described herein can be included within the facepiece 602. In some embodiments, the mouthpiece may comprise one or more elements, such as bite plates, grooves, and/or lips. These elements have the advantage the mouthpiece may thereby fit comfortably in the mouth of a user. In some embodiments, a mouthpiece may not be present and the facepiece 602 can be used by being held against the user's face. The facepiece 602 may not require any elastic or straps to hold the facepiece 602 to the user's face, wherein the mouthpiece held in the user's mouth holds the facepiece against the user's face.

FIG. 7A illustrates the facepiece 602 inside the hood 202. The facepiece 602 may be placed on either side of the user's head within the hood 202. When the user dons the hood 202, the facepiece 602 can be placed out of the way within the hood 202. The facepiece 602 may be accessible to the user such as be grasping the mouthpiece within the facepiece 602 with their mouth without having to use their hands.

Figure 7B:
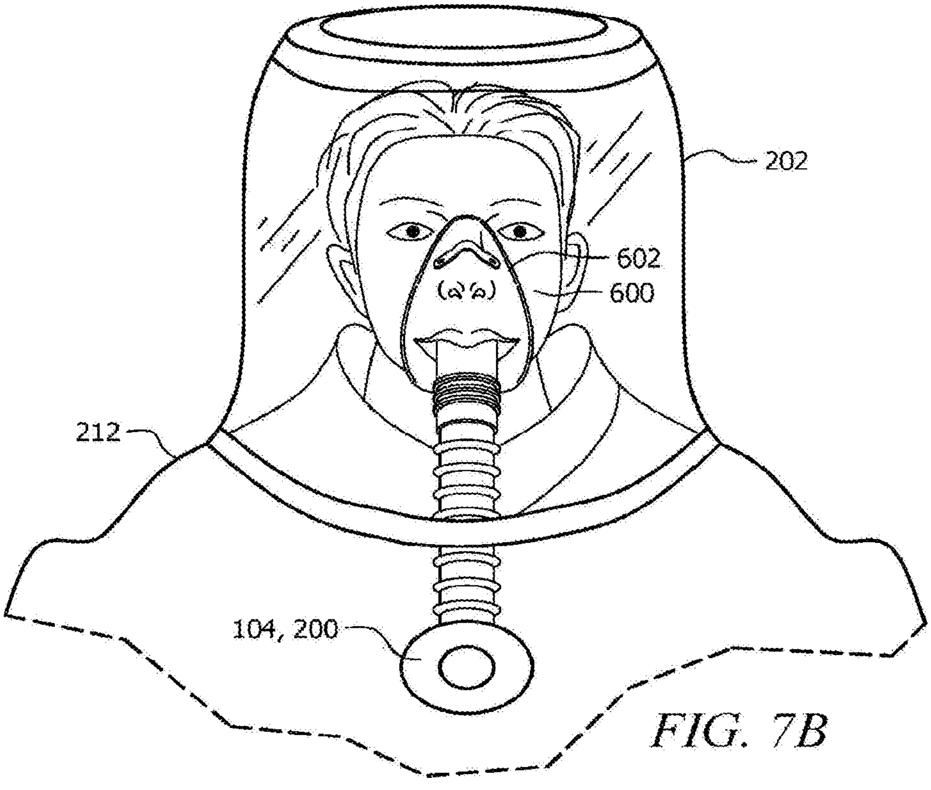

FIG. 7B illustrates the hood 202 and facepiece 602 when the facepiece 602 is worn on the user's face. The user may grasp the mouthpiece using their mouth to place the facepiece 602 onto their face. The user may bend their neck and shoulders to reach the mouthpiece with their mouth. The user may wish to wear the facepiece 602 that is coupled to the filter 104, 190 to provide filtered breathing air as described herein. Additionally, when doffing the hood 202, the user may be in an area where exposure to hazardous gases is still possible. Therefore, the user may wear the facepiece 602 coupled to the filter 104, 190 to provide filtered breathing air until the user can move to a safe area. When the user is doffing the hood 202, the user may remove the filter 104, 190 from the hood 202 to allow the user to continue wearing the facepiece 602 when the suit is removed.

A method of using a ventilated hood as previously described may comprise donning a ventilated hood, where the ventilated hood comprises an external air flow hose, a filter incorporated in the ventilated hood, and a first seal and where when the first seal is intact, air does not flow out through the filter from an interior of the ventilated hood. The method may further comprise, after donning the ventilated hood, breaching the first seal and after breaching the first seal, inhaling air received from the filter. Breaching the first seal may comprise ripping the first seal at least partly free of the ventilated hood. Ripping the first seal may comprise ripping the first seal free of a tearable weld coupling the first seal to the ventilated hood. In an embodiment, the ventilated hood further comprises a second seal, the first seal is coupled to an exterior of the ventilated hood, and the second seal is coupled to an interior of the ventilated hood. In this embodiment, the method may further comprise breaching the second seal by ripping the second seal at least partly free of the ventilated hood. The second seal, in this embodiment, may be breached before donning the ventilated hood. Alternatively, the second seal may be breached after donning the ventilated hood, for example by reaching with a hand below the cowl 212 to grip the second seal and rip it at least partly free of the ventilated hood. Reaching under the ventilated hood to rip the second seal at least partly free of the ventilated hood may be performed at about the time the ventilated hood is donned or at about the time that it is desired to commence inhaling air through the filter. In some cases the method may further comprise tearing the emergency breathing apparatus 104, 190 free from the cowl 212 or free from the head enclosure 208, for example when doffing the encapsulated protective suit 100 or the ventilated hood 202 in a changing room.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A ventilated hood, comprising:

an external air flow hose coupled to the ventilated hood;

an emergency breathing apparatus comprising a filter incorporated in the ventilated hood, the filter having an exterior face and an interior face, where the exterior face of the filter is configured to face towards an exterior of the ventilated hood and wherein the interior face of the filter is configured to face towards an interior of the ventilated hood;

a first seal coupled to one of the exterior of the ventilated hood or the exterior face of the filter;

a facepiece;

a breathing pipe coupled at one end to the filter and at a second end to the facepiece;

a head enclosure; and a cowl coupled to the head enclosure and configured to drape over a top of the shoulders of a user of the ventilated hood, wherein the emergency breathing apparatus is removably coupled to the cowl with a tearable weld and/or an adhesive joint.

2. The ventilated hood of claim 1, further comprising a collar, where the collar is configured to inflate when air is flowing through an external air flow hose and to impede infiltration of contaminants from an outside environment into an inside of the head enclosure.

3. The ventilated hood of claim 2, wherein the collar is configured to leak the received airflow in a controlled manner such that removal of the received airflow deflates the collar to avoid suffocation.

4. The ventilated hood of claim 1, wherein the filter is incorporated in the cowl.

5. The ventilated hood of claim 2, wherein the filter is incorporated in the head enclosure.

6. The ventilated hood of claim 1, wherein the filter comprises at least one of an absorbent medium and an adsorbent medium.

7. The ventilated hood of claim 2, wherein the filter is coupled to the head enclosure.

8. The ventilated hood of claim 1, wherein the external air flow hose is coupled to a powered air purifying respirator (PAPR).

9. The ventilated hood of claim 2, wherein the collar comprises a crossing configured to allow the emergency breathing apparatus to pass through the collar.

10. The ventilated hood of claim 1, wherein the facepiece is configured to fit over the nose and mouth of the user.

11. The ventilated hood of claim 10, wherein an edge of the facepiece is configured to seal against the face of the user when worn.

12. The ventilated hood of claim 1, wherein the facepiece includes a mouthpiece configured to allow the user to hold the facepiece against their face.

13. The ventilated hood of claim 12, wherein the breathing pipe passes through an opening in the facepiece, wherein the breathing pipe is coupled at one end to the filter and at the other end to the mouthpiece.

14. The ventilated hood of claim 1, wherein the facepiece comprises an exhalation valve.

15. The ventilated hood of claim 10, wherein the facepiece comprises a nose clip configured to fit over the nose of the user.

16. The ventilated hood of claim 1, further comprising a second seal coupled to one of the interior of the ventilated hood or the interior face of the filter.

17. The ventilated hood of claim 16, wherein the filter is moisture laden when both the first seal and the second seal are intact.

* * * * *